United States Patent

[11] 3,612,972

| [72] | Inventor | Ferdinand Konig<br>Seuzach, Switzerland |
|---|---|---|
| [21] | Appl. No. | 6,524 |
| [22] | Filed | Jan. 28, 1970 |
| [45] | Patented | Oct. 12, 1971 |
| [73] | Assignee | Sulzer Brothers, Ltd.<br>Winterthyr, Switzerland |
| [32] | Priority | Feb. 6, 1969 |
| [33] | | Switzerland |
| [31] | | 1815/69 |

[54] ADJUSTING DRIVE
3 Claims, 1 Drawing Fig.

[52] U.S. Cl. .................................................. 318/227,
318/266, 318/466
[51] Int. Cl. ..................................................... H02p 1/40
[50] Field of Search ......................................... 318/227,
266, 466, 467, 468, 626, 627

[56] References Cited
UNITED STATES PATENTS

| 2,007,658 | 7/1935 | Panish .......................... | 318/469 |
|---|---|---|---|
| 3,143,696 | 8/1964 | Harris ........................... | 318/266 |
| 3,332,007 | 7/1967 | Livengood et al. ............ | 318/447 |
| 3,513,374 | 5/1970 | Koment ........................ | 318/266 |

Primary Examiner—Oris L. Rader
Assistant Examiner—K. L. Crosson
Attorney—Kenyon & Kenyon Reilly Carr & Chapin ABSTRACT: The adjusting drive is controlled in dependence on the excess current of the motor and acts on either of the switching means in the conductor lines between the motor and current source to switch off the motor. A blocking arrangement is also used so as to prevent further movement of the motor after a shutdown which arrangement becomes unblocked upon reversing of the motor.

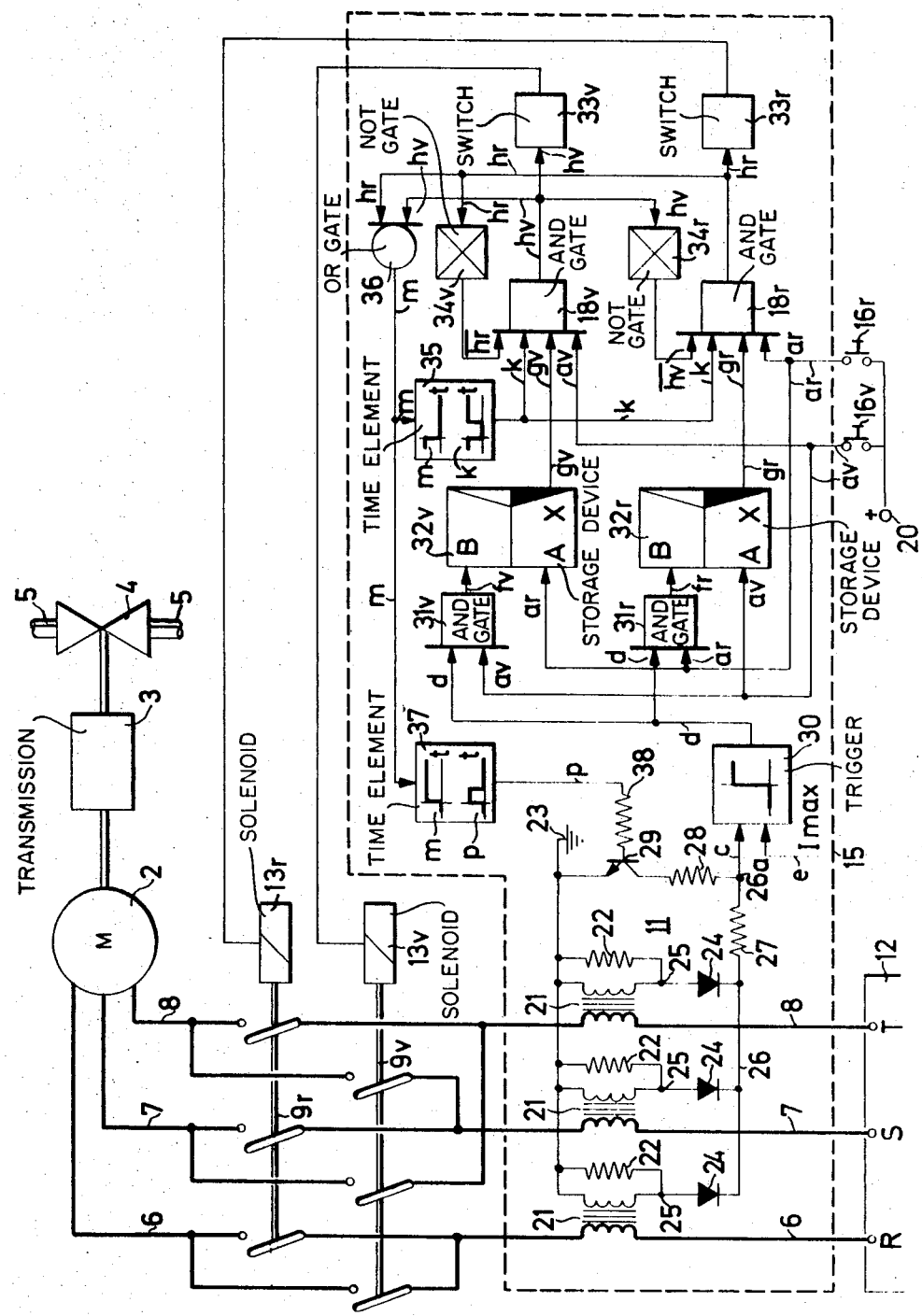
Inventor:
FERDINAND KÖNIG

ADJUSTING DRIVE

This invention relates to an adjusting device and more particularly to an electronic adjusting device for controlling the rotation of an asynchronous motor.

Adjusting drives have been known in which an asynchronous motor for driving an adjusting element, such as a valve, has been reversibly operated through switching devices which function so that a first switching means is operated in one direction of rotation and a second switching means is operated in the opposite direction of rotation. Generally, these adjusting drives have utilized a measuring apparatus which measures the current in the motor and acts on a switch device in response to excesses of current in order to switch off the motor current.

In the case of adjusting drives which adjust a mechanical adjusting element, for example, a valve in a pipe of a steam power plant, position indicators have been used to indicate various positions, such as two extreme end positions, of the adjusting element. However, these position indicators have entailed a considerable amount of expense. For example, these position indicators have required protection from the environment and have required some articulation or other cooperation with the moving parts of the adjusting element. Further, the exact adjustment of the two indicators have created difficulties such that their accuracy and reliability have often been inadequate.

Accordingly, it is an object of the invention to eliminate the need for position indicators in adjusting drives of the kind above described.

It is another object of the invention to control the operation of an adjusting drive without directly determining the end position of an adjusted adjusting element.

It is another object of the invention to issue switch-off commands in adjusting drives of the above kinds in response to the motor current exceeding a predetermined limit value.

While it is known in the case of adjusting drives, as above, to provide motor-protecting switches that protect the motor from excess current and that act on the main switch in the connection to the network; such switches, apart from their inertia, are not suitable for solving the problem posed. That is, these switches prevent any switching-in again, i.e., they prevent a starting up, in the reverse direction out of an end position.

Briefly, the invention causes the responding measuring device in an adjusting drive as above to act in each case on the first or second switching means associated with the switched-on direction of rotation to switch off the motor.

The invention can be utilized for switching-off in an end position, both in the case of adjusting or positioning drives having continuously adjustable adjusting elements regulated by the aid of an adjusting regulator, and in the case of adjusting drives having only two definite positions for the adjusting element. The invention is particularly useful with the latter adjusting drives, because they can be made easily and economically therewith. Of course, with such adjusting elements intermediate positions can also be reached by prematurely cancelling the switch-on signal.

In order to prevent premature switching-off of the motor during the starting-up phase which may otherwise occur as a result of the increased need for current during this phase, means are provided through which the motor current during the starting-up phase is able to assume a higher value for a prescribed interval of time without a switching-off resulting.

Further, protection against mechanical overstressing of the moved parts of the adjusting element can be obtained when locking or blocking means are provided that, at a switch-off of the motor by the current-measuring device, prevent a switching-on again in the preceding direction of rotation, and that become unlocked by a signal for switching on the motor in the opposite direction.

Furthermore, if the adjusting element is made in such a way that intermediate positions can be adjusted to through effacing the switch-on signal, then it is advantageous to provide retardation means in the circuit logic which after a switching-off allow a reswitching-on of the motor after a prescribed interval of time only. This prevents the motor during continuous "tapping" by its switch-on signal at brief intervals of time in succession from becoming loaded with the higher startup current, and thus prevents a thermal overload.

These and other objects and advantages of the invention will become more apparent from the following detailed description and appended claims taken in conjunction with the accompanying drawings in which:

The FIGURE schematically illustrates an adjusting drive according to the invention for controlling a valve having two definite end positions.

Referring to the drawing, the positioning drive has an asynchronous motor 2, which by means of a transmission 3 adjusts an "off-on" valve 4 in a pipe 5. The motor 2 is connected to the three phases R, S and T of a three-phase network 12 through the intermediary of conductors 6, 7 and 8, in each of which are disposed switching means $9v$ and $9r$, as well as a current-measuring device 11. A main switch (not shown) can also be provided between the current-measuring device 11 and the connection to the network 12. The switching means $9v$ and $9r$ are operated as mechanical switches by solenoids $13v$ and $13r$.

It is noted that the elements and signals shown in pairs in the drawing for moving the adjusting element (valve 4) in the opening or closing direction, have the same reference numerals or characters and are distinguished from one another by the addition of "$v$" for the opening direction and of "$r$" for the closing direction.

The switching-on and switching-off of the motor 2 is controlled by a switching logic 15, in which the diagram for the flow of signals is given by the usual symbolism with the switching being done by elements known in digital technology. Electric voltages are employed throughout in the switching logic 15 as signals.

The switch-on of the motor 2 is effected by two pushbutton switches $16v$ or $16r$, by means of which switching signals $av$ or $ar$ are conducted from a source of positive current to two AND elements $18v$ or $18r$. The switch $16v$ is used as an "on-off" switch for one direction of rotation of the motor 2 while the other switch $16r$ is similarly used for the opposite direction of rotation of the motor 2. The entire drive can thus be switched on or off by means of these switches $16v$, $16r$ for the case concerned.

The current-measuring device 11 has for each phase R, S and T, of the three-phase network 12 a measuring transformer 21, whose secondary winding is, in each case, connected to a resistance 22 and has a connection to the zero or reference potential 23 of the control device 15. By way of diodes 24, the potentials dependent on the current flowing through the resistances 22 are at the point 25 conducted in parallel to the output 26 of the current-measuring device 11. In this way, the instantaneous value of the voltage U26 appearing at the point $26a$ is equal to the maximum value of the currents flowing at the instant in the conductors 6, 7 and 8. The potential U26 at the point $26a$ forms the output signal $c$ of the measuring device 11. The measuring device 11 further includes a voltage divider formed by two resistances 27 and 28 and an associated transistor 29 acting as a switch. The purpose and operation of this voltage divider 27, 28 and switch 29 will be explained below.

The signal $c$, which serves as a switch-off signal for switching off the motor 2 after the valve 4 runs into one of its two end positions, is conducted as an input signal for a trigger 30. The trigger 30 in turn produces at an output a signal $d$ as soon as the positive signal $c$ exceeds a second negative input signal $e$ which reproduces a fixed set desired value for the maximum allowable current $I_{max}$ through the motor 2.

Since a rise of the motor current always occurs when the adjusting element driven thereby becomes greatly braked, that is either upon reaching the two end positions of the adjusting element, or in the event of derangements, the signal $d$ can, therefore, in known manner, also serve as a safety signal for switching off the motor 2 in the event of a derangement. For example, when the end position of the valve 4 in the closing direction can not be reached because of some foreign object being clamped in between the valve and its seat, the signal $d$ can be used to switch off the motor 2.

The output signal $d$ from the trigger 30 arrives at two AND elements 31$v$ and 31$r$ on which there are also imposed, as additional switching conditions, either the switch-in command $av$ for the switching-in in the opening direction (AND gate 31$v$), or the command $ar$ for the switching-in in the closing direction (AND gate 31$r$).

As shown, from the trigger 30 onward, the AND gate 31 and also the further elements of the switching logic 15, with but few exceptions which will be separately described, are in each case present in pairs. Therefore, for purposes of clarity an exact description only for the one series of signals that effect a switch-in and a switch-out in the opening direction will be given. The way in which the other set of signals works is then found analogously through interchanging the specific signals for the switching in a certain direction. Thus, for example, the switch-in condition $av$ at the AND gate 31$v$ correspond to the switch-in condition $ar$ at the AND gate 31$r$, and so forth.

In the directions in which the signals flow, a storage device 32$v$ which has one definite switch-in position follows the AND gate 31$v$. This storage device 32$v$ is constructed on a bistable circuit (flip-flop) of known design, which at the appearance of a signal at its input A, and also at the switch-on of its supply voltage, is set into a basic or switch-on position.

While the storage device 32$v$ has a second input B, in addition to its input A it, however, has only one output X. At this output X, as soon as the storage device 32$v$, through the switch-on of its supply voltage or through a signal $ar$ at its input A, is set into the position illustrated, a signal $gv$ appears.

If, however, this storage device 32$v$ is, through the output signal $fv$ of the AND gate at its input B, set into its other position, then output signal $gv$ at output X vanishes and so also the switch-onward condition at the AND gate 18$v$. Because the AND gate 18$v$ at its output passes on the switching command $hv$ for the switch 33$v$ which in turn switches the current through the solenoid 13$v$ and thus switches in the switch 9$v$ for the running of the motor 2 in the opening direction, the vanishing of the signal $gv$ represents the switch-out command for the motor 2 in this direction. With the appearance of the signal $av$ at the AND gate 31$v$, therefore, the appearance of the signal $d$, and thus the entry of excess current into the conductors 6 to 8, effects the desired switch-off of the motor 2 in the "open" position.

Once the motor 2 has thus been switched off in the "open" direction due to the disappearance of the signal $gv$, the motor 2 cannot be restarted and driven in the "open" direction unless the signal $gv$ reappears. However, this signal $gv$ cannot reappear unless the storage device 32$v$ is reset.

In order to reset the storage device 32$v$ into the basic condition so that the necessary switch-onward condition signal $gv$ can be sent to the AND gate 18$v$ for the switch-on command for the opening direction, it is necessary for a signal $ar$ to be transmitted thereto. However, the signal $ar$ which is the switch-on command for the closure direction can only be transmitted when the switch 16$r$ is closed. Thus, this means of resetting the storage device 32$v$ serves as a latching or blocking means that prevents switching on again of the motor 2 in the previous, i.e., "open," direction of rotation. This blocking means is unlatched when the switch 16$r$ is closed in order to drive the motor 2 in the "closed" position.

Two further switch-onward conditions are sent to the AND gate 18$v$ which have to appear, together with the signals $av$ and $gv$, before a signal $hv$ appears at the output of the AND gate 18$v$. One of these supplementary conditions is formed of the signal $hr$, that is, of the switch-on command for the switch-on of the switches 33$r$ and 9$r$ during the starting up of the motor in the closure direction. The signal $hr$ is inverted in a NOT element 34$V$, and is as the signal $\overline{hr}$ ("not $hr$" or "$hr$ inverse") fed to the AND gate 18$v$. An appearance of this signal $\overline{hr}$ at the AND gate 18$v$ indicates that no switch-on signal for the motor 2 in the closure direction exists. This signal $\overline{hr}$ therefore ensures that contradictory switch-on signals $h$ can not be given at the same time for both directions.

The last of the four indicated switching-onward conditions at the AND gate 18$v$ is produced by a time element 35 as its output signal $k$, which, as is shown, acts in a similar way on the AND gate 18$r$ to form a switch-onward condition.

The time element 35, which is formed of a monostable multivibrator of known type, produces, at the appearance of a signal $m$ at its input, an output signal $k$. If input signal $m$ vanishes, then output signal $k$ also vanishes; however, after an interval of time determined by the dimensions of an RC element contained in the multivibrator, the output signal $k$ reappears even with the input signal $m$ being missing.

Thus, if a switch-on signal $a$ is given before the signal $k$ is reestablished after a switch-off, that is after a vanishing of $m$, then the switch-on becomes retarded to the end of the interval of time. This time interval is chosen so that the motor 2, after a switching-off through a vanishing of the switch-on command $a$ (not through the device 11), comes at least approximately to a standstill. After the expiration of the interval of time, the motor 2, if a signal $a$ exists, becomes switch-on, and then the signal $m$ reappears at the input of the time element 35 without any change of the output signal $k$ before the next switch-off.

An appearance of the signal $k$ thus produces the switch-on condition in which the motor 2 after being switched off can be switched on again only after a certain delay. The time element 35, as has already been mentioned, thus prevents a "tapping" at short intervals of time through switch-on signals $h$, by the aid of the corresponding pushbutton switch 16. The pattern of the input signal $m$ and of the output signal $k$ of the time element are shown as a function of time on the time element 35.

The signal $m$ becomes formed as the output signal from an OR gate 36, when one of the switch-on commands $hv$ or $hr$ for the switch 33 appears at its input.

The signal $m$ farther on arrives at a second time element 37. This time element 37 is also formed of a monostable multivibrator which is made complementary to the aforesaid time element 35 although with a different, and in this case shorter, time constant. The term "complementary" does not mean that at the switching-off of the input signal $m$ the output signal $p$ also vanishes for a certain time, but means that at the appearance of $m$ there appears for a certain interval of time an output signal $p$, which, with the presence of an input signal $m$, vanishes again after a certain time. As above, the patterns of the input signal $m$ and of the output signal $p$ of the time element 37 are plotted on the time element 37 as a function of time $t$.

The signal $p$ acts, over an ohmic resistance 38, on the base of the transistor 29, and makes the transistor 29 conductive for the duration of the output signal pulse $p$ of the time element 37. As a result, for the duration of this output signal pulse $p$ from the time element 37, the signal $c$ is divided by the voltage divider 27, 28 in proportion to these resistances, so that for the time duration, the input signal $c$ of the trigger 30 is artificially reduced. This ensures that the desired value $I_{max}$ which has been adjusted to can be exceeded by a certain amount during the starting-up phase by the current needed to flow through the motor 2.

It is to be emphasized once more that the invention is not limited to the described example of construction of the adjusting element having only two definite positions, but the invention can also be utilized with continuously adjustable adjusting elements, with which by the aid of a position indicator for the setting of the adjusting element, any desired definite position between the two end positions can be adjusted to. It is furthermore possible to make the switching logic 15 as a control using analog technology. It is also possible to drive the asynchronous motor with single-phase or two-phase alternating current, instead of with three-phase current.

What is claimed is:

1. A positioning drive for moving an element to be positioned including:

an asynchronous motor;
a first switching means connected to said motor for permitting rotation of said motor in one direction;
a second switching means connected to said motor for permitting rotation of said motor in an opposite direction;
a switching circuit for actuating said first and second switching means, said switching circuit including an on-off switch for each direction of rotation;
a current measuring device for measuring current supplied to said motor; and
a switching device connected between said current measuring device and said first and second switching means, said switching device being responsive to a measurement of current in said current measuring device in excess of a predetermined value for opening said first or second switching means in dependence on the direction of rotation of said motor to switch off said motor, said switching device including blocking means responsive to a switching-off of said motor in dependence on the current measurement in said current measuring device for preventing subsequent switching-in of said motor in the same direction of rotation as previously, said blocking means being deactivated upon said switching device switching in said motor in the opposite direction of rotation.

2. An adjusting drive as set forth in claim 1, further including means for increasing the current through said motor during startup above said predetermined value while simultaneously preventing actuation of said switching means.

3. An adjusting drive as set forth in claim 1 further including means for delaying a switching-on of said motor for a determined period of time after a switching-off of said motor.